J. M. B. REIS.
COAL LEVELING APPARATUS.
APPLICATION FILED JUNE 24, 1909.

1,031,375.

Patented July 2, 1912.
8 SHEETS—SHEET 2.

Witnesses:
Chas. S. Lepley
Henry Sens

Inventor:
Jared M. B. Reis
by A. M. Clarke
his attorney

J. M. B. REIS.
COAL LEVELING APPARATUS.
APPLICATION FILED JUNE 24, 1909.

1,031,375.

Patented July 2, 1912.
8 SHEETS—SHEET 3.

J. M. B. REIS.
COAL LEVELING APPARATUS.
APPLICATION FILED JUNE 24, 1909.

1,031,375.

Patented July 2, 1912.
8 SHEETS—SHEET 5.

Fig. 13.

Witnesses:

Inventor.

J. M. B. REIS.
COAL LEVELING APPARATUS.
APPLICATION FILED JUNE 24, 1909.

1,031,375.

Patented July 2, 1912.
8 SHEETS—SHEET 6.

J. M. B. REIS.
COAL LEVELING APPARATUS.
APPLICATION FILED JUNE 24, 1909.

1,031,375.

Patented July 2, 1912.
8 SHEETS—SHEET 7.

UNITED STATES PATENT OFFICE.

JARED M. B. REIS, OF NEW CASTLE, PENNSYLVANIA.

COAL-LEVELING APPARATUS.

1,031,375.　　　　　Specification of Letters Patent.　　Patented July 2, 1912.

Application filed June 24, 1909. Serial No. 504,033.

*To all whom it may concern:*

Be it known that I, JARED M. B. REIS, a citizen of the United States, residing at New Castle, in the county of Lawrence and State of Pennsylvania, have invented certain new and useful Improvements in Coal-Leveling Apparatus, of which the following is a specification, reference being had therein to the accompanying drawing.
My invention consists of an improvement in machines for leveling and spreading coal in beehive coke ovens.

The object of the invention is to provide means for leveling the coal in a circular chamber, particularly the coal charged into that type of ovens from a larry or mine car through the trunnel head or vent of the oven, and is an improvement in that class of leveling machines which operates through the trunnel head.

It is a well known fact that when coal is dumped from an elevated spout onto a flat surface, as the floor of an oven, it will pile up in the form of a cone, the sides of which will slope downwardly at an angle of about 45°. In the manufacture of coke from coal in an oven it is first necessary to level the coal dumped into the oven to a flat surface and this work has heretofore been done mainly by hand by means of a scraper bar introduced through the side or front door of the oven, which is a very slow and laborious operation.

I am aware that other inventors have designed leveling machines for operation through the trunnel opening of an oven, intended to perform the same work as I have in view and to overcome the difficulties and expense of hand leveling. I am aware that such a proposition is not broadly new and that such devices are shown in the following Letters Patent: Murray, No. 826184 of July 17th, 1906. Hower, Nos. 841868 and 841869 of January 22nd, 1907, and Ham No. 876175 of January 7th, 1908. My invention is different from these however, in the several features covered by the claims.

In view of the existing conditions in beehive ovens and to overcome the disadvantage of hand leveling, and to provide improved mechanism for quickly and uniformly performing the operation through the trunnel opening, my improved machine consists of a folding telescoping tool arranged for insertion downwardly through the trunnel head of the oven, adapted to be extended to opera-
tive position, and to be rotated annularly throughout the area of the oven for spreading and leveling the coal therein.

The machine consists generally of a vertically adjustable telescoping standard, preferably mounted on a laterally swinging frame and provided with an adjustable terminal sweep, means for raising and lowering it, means for rotating the standard, means for adjusting it to different levels within the oven and for centralizing the standard over the trunnel opening, and of various other features of construction as shall be more fully hereinafter described.

I am aware that it is not broadly new to lower a spreader tool through the trunnel opening of an oven and to erect leveling bars horizontally and rotate them within the oven. My invention however, is novel over such in that the outer ends of the spreader bars are maintained at the lower position at all times, thereby avoiding the difficulties of adjustment and manipulation where their outer ends are swung up. The improvement includes the various features of construction for operating this type of spreader.

In the drawings:
Figure 1 is a view showing a larry provided with two machines in operative relation to two opposite ovens, the machine at the left side being retracted for shifting and the one at the right side being in position for operation.
Fig. 1ª is a detail view in elevation of the vertically adjustable centering device.
Fig. 2 is an enlarged vertical sectional view in working position similar to the right side of Fig. 1, showing the parts more in detail.
Fig. 3 is a similar view showing the parts retracted.
Fig. 4 is a plan view of Fig. 3.

While it will be understood that the leveling machine may be mounted on any suitable carriage for transportation along the tracks between two banks of ovens or over a single bank, the preferred construction, as shown in the principal drawings, is to mount one machine at each side of a larry so that the work of charging and leveling the ovens may be carried on consecutively and with economy of time. Thus, the ovens are charged by the larry and then leveled, thereby obviating the necessity of separate leveling machines, each larry thus constituting a single complete unit.

Figures 6, 7, 8, 9, 10:
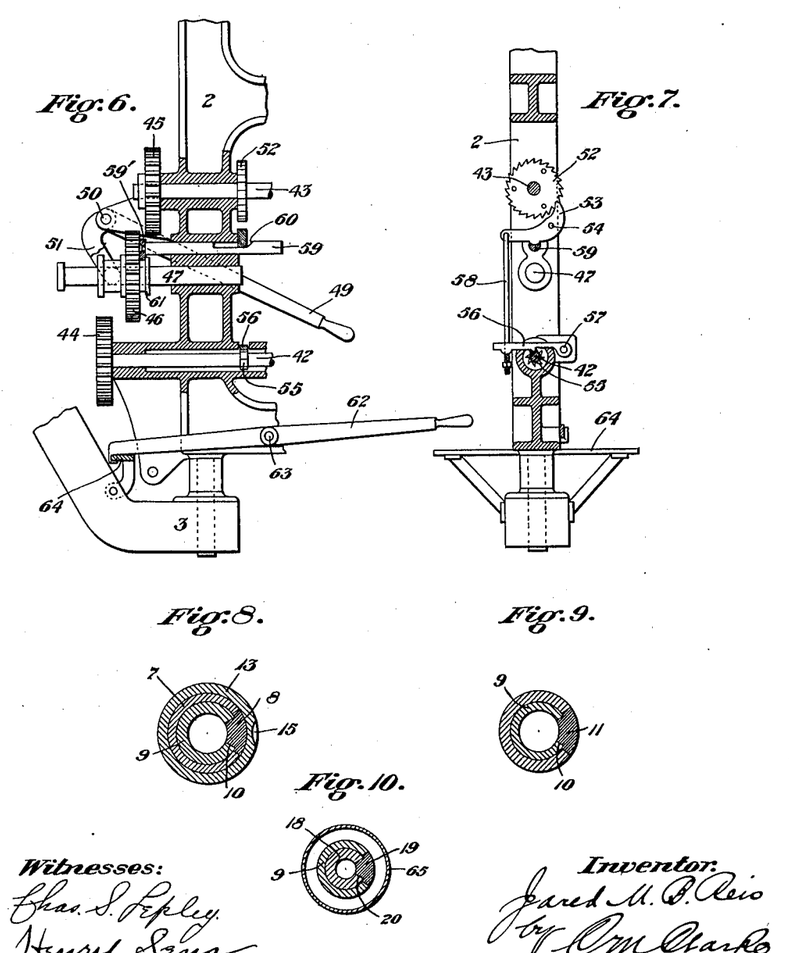
Figs. 6 and 7 are sectional detail views of parts of the swinging frame and the gear controlling mechanism.
Figs. 8, 9 and 10 are cross sectional views on the lines VIII. VIII; IX. IX; and X. X. respectively, Fig. 2.
Figures 11, 12:
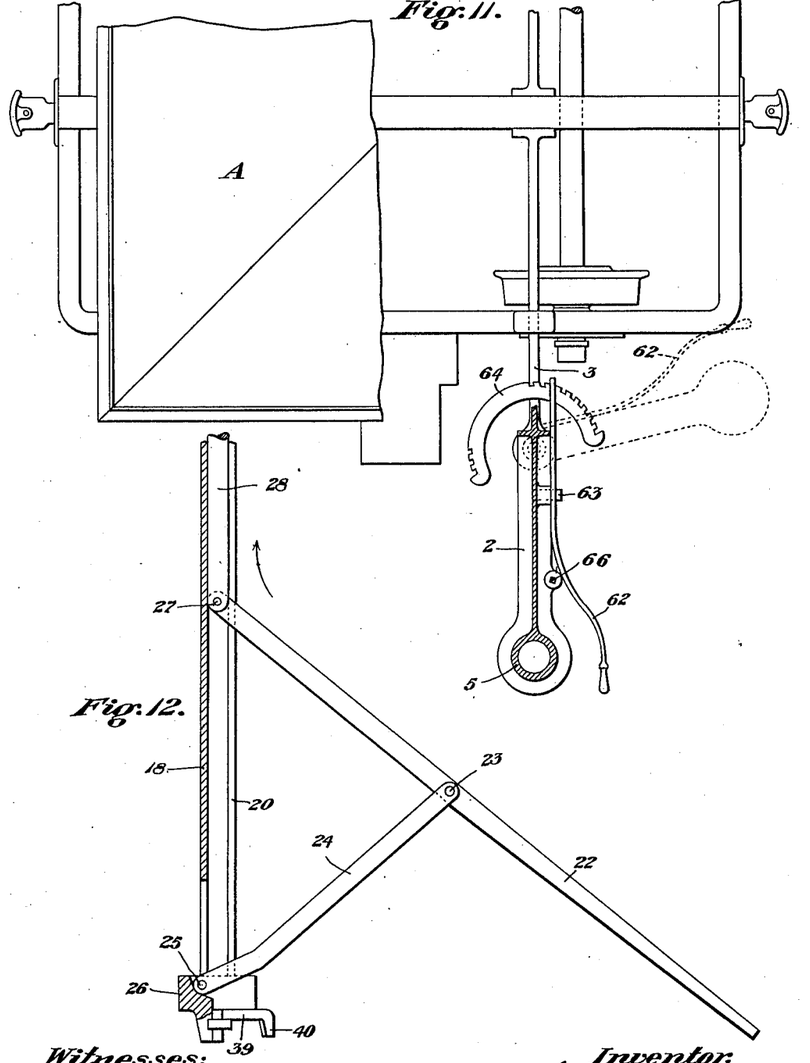
Fig. 11 is a plan view of part of a larry showing the means for positioning and locating the swinging frame.
Fig. 12 is a detail view of the working terminal of the mechanism and illustrating the retraction of the sweep.

It is desirable that the machines shall be mounted on the larry A or other carriage for lateral swinging, for which purpose the main supporting frame 2 of the machine is pivotally mounted at top and bottom by suitable pivotal bearings, upon a lower supporting bracket 3 and to an upper centering bracket 4. This arrangement provides for adjustment of the machine on its carriage with relation to the trunnel hole and also allows for the folding in of the machine toward the carriage for clearance of the bin structure or other obstruction, as shown in Fig. 11. Extending outwardly from the swinging frame 2 at the bottom and about midway of its height are vertical bearings 5 and 6 through which the telescoping working standard operates and by which said standard, constituting the main operating element of the machine, is carried. Said standard is composed of an outer supporting hollow rotatable cylinder 7 with which, by a spline or key 8 is telescopically connected the hollow plunger 9 having a longitudinal slotted key-way 10 for engagement of said key 8 and a similar key 11. Keys 8 and 11 are of the construction shown in the cross sectional views Figs. 8 and 9 and operate to slidingly connect the cylinder 7 with plunger 9 and said plunger with its driving bevel gear 12 respectively, in the hub of which key 11 is mounted. As thus connected, cylinder 7 and plunger 9 will rotate together while plunger 9 may rise or fall within cylinder 7, and both may rotate within a common vertically adjustable bearing 13 mounted within the bearing 6. Said bearing 13 is vertically movable within the main frame bearing 5 by means of a worm wheel 14 engaging rack teeth 15 and operated by bevels 16 and hand wheel 17, carried in an outwardly extending bracket forming a portion of the bearing 6, as clearly shown. The object of this construction is to adjust the entire composite standard for variations in the normal level or surface of the coal charge, caused by varying the charge, due to the contingencies of operating the ovens for longer or shorter periods, as is readily understood in the manufacture of coke. As shown, the cylinder 7 rests upon the shouldered bottom of the adjustable bearing 13, while the hollow plunger 9 is also provided with a shoulder limiting its downward travel therethrough, but permitting free upward movement within the cylinder 7. Extending downwardly through the lower end of plunger 9 is a terminal plunger 18 similar in construction to plunger 9 and in sliding rotatable operative engagement therewith by means of a key 19 engaging the lateral longitudinal slotted key way 20 in plunger 18, whereby it is maintained in rotative engagement at any position. The upper end of terminal plunger 18 is shouldered as indicated at 21, limiting its downward movement therein to the collapsed or assembled operative position shown in Fig. 3.

Figures 2, 3, 4:
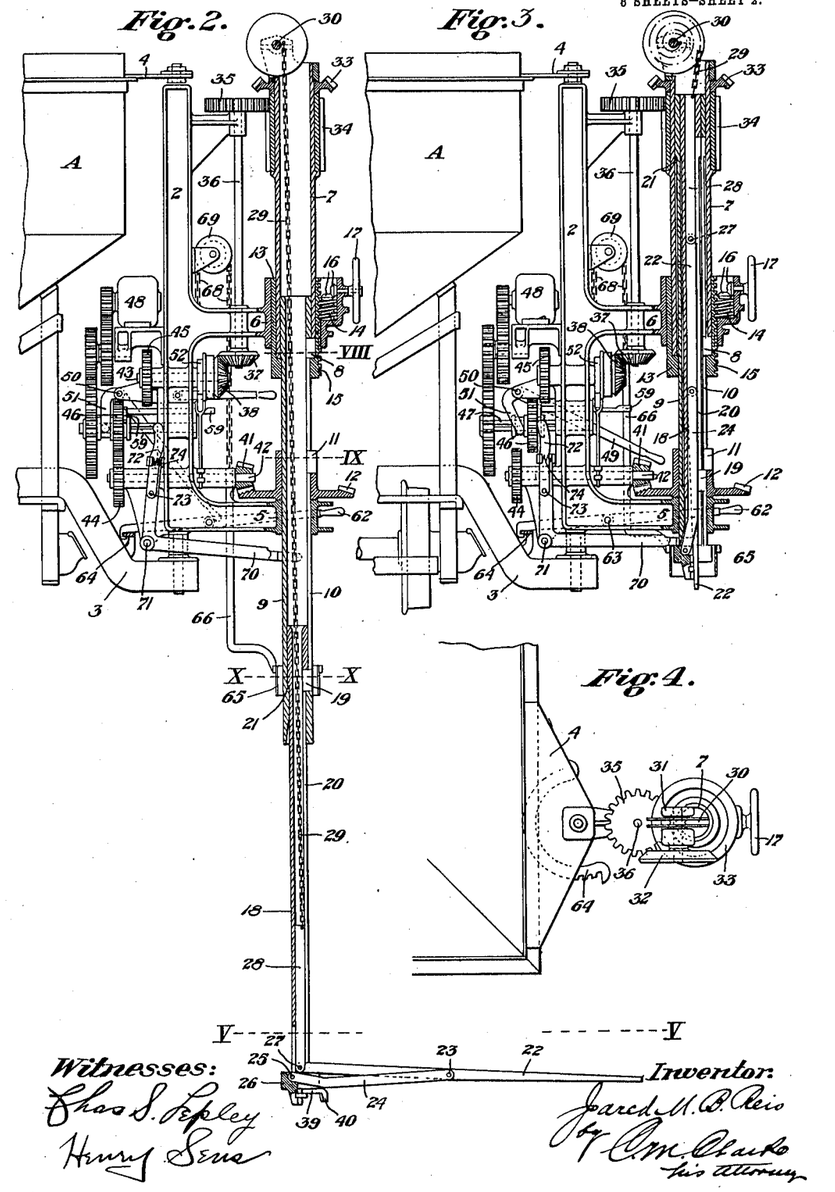

The element which directly engages the surface of the coal for leveling it is the spreader bar 22, pivotally connected at 23 with the bracing arm or strut 24 which in turn is pivotally mounted at 25 in the terminal head 26 at the lower end of terminal plunger 18. Pivotally connected to the inner end of the spreader bar 22 at 27, is a vertically movable bar 28 slidingly operable within the interior of the lower plunger and of sufficient weight to fall by gravity to erect the spreader bar, and operable to lift the inner end of the spreader bar to collapse it when bar 28 is raised. Said bar 28 and the inner end of the spreader bar are raised by a chain 29 extending upwardly through the hollow interiors of the plungers 18 and 9 and cylinder 7 and connected with a winding shaft or sheave 30 mounted in brackets 31 extending upwardly at each side of the upper terminal or cylinder 7.

Figure 5:
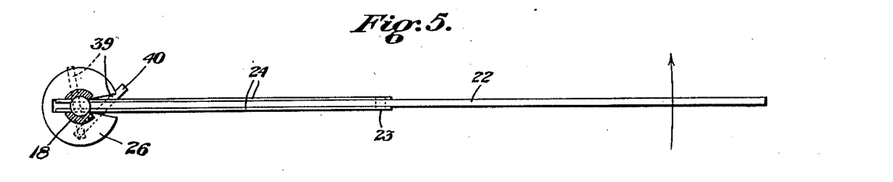
Fig. 5 is a further enlarged horizontal sectional view indicated by the line V. V. of Fig. 2.
Figures 21, 22, 23, 24, 25:
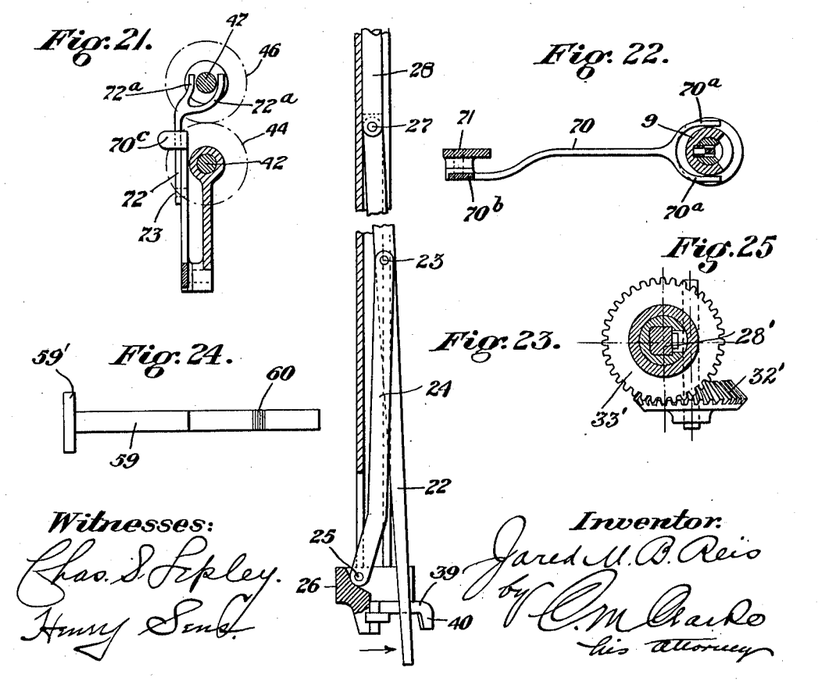
Fig. 21 is a vertical section on the line XXI. XXI. of Fig. 20.
Fig. 22 is a horizontal section on the line XXII. XXII. of Fig. 20.
Fig. 23 is a sectional detail view of the lower end of the plunger showing the spreader bar collapsed.
Fig. 24 is an enlarged plan view of the shifting cam bar for actuating the ratchet pawl.
Fig. 25 is an enlarged detail view in plan of the gears 32′ and 33′ illustrating the arrangement of the teeth of said gears, showing the parts in section as indicated by the line XXV. XXV. of Fig. 15.

At one end of the shaft carrying the winding sheave is a bevel gear 32 meshing into a similar gear 33 having extending downwardly or integral with it an elongated pinion 34 whereby the bevel gears are rotated to actuate the sheave to wind or release the chain 29 for raising or lowering of the spreader bar, and also for collapsing or extending the telescoping plunger sections within the cylinder 7, as will be readily understood from Figs. 2 and 3. Pinion 34 is actuated by spur gear 35 at the upper end of shaft 36, mounted in suitable bearings in the frame 2 as shown, and provided at its lower end with a driven bevel 37 in mesh with a driving bevel 38. Pivotally mounted in the lower part of terminal head 26 is a laterally swinging latch 39 having a downwardly projecting terminal 40 for engagement with the coal. When the plunger 18 is lowered downwardly through the trunnel head of the oven, the spreader bar 22 is in the position indicated in Fig. 3, the end 40 projecting slightly beyond the said terminal head 26, as shown in dotted lines Fig. 5. When the entire standard is rotated by the means hereinafter described for the purpose of spreading, in the direction indicated by the arrow Fig. 5, the point 40 of trigger arm 39, becoming engaged by the coal, head 26 will rotate, thrusting arm 39 outwardly as indicated in said figure, thrusting outwardly the lower end of the spreader bar 22, permitting the weight of bar 28 to complete the erecting operation in addition to the contact with the coal. The commencement of the operation of shifting the vertically pendent terminal of spreader bar 22 by the trigger arm 39 upon rotation of head 26 so as to thrust it outwardly from the head is shown in Fig. 23. As the head 26 and plunger 18 continue to rotate the terminal of the spreader bar will drag through the coal and be worked out to operative position, assisted by the weight of bar 28. By this means any tendency to lock and avoid opening up at the commencement of the operation is thus positively prevented and the lateral working position of the spreader bar accomplished.

For the purpose of rotating plungers 9 and 18, plunger 9 is provided with the driven bevel wheel 12 referred to, in spline engagement with the plunger 9 by the key 11, and in mesh with the driving bevel wheel 41 on the end of shaft 42 which, like shaft 43 carrying bevel 38, is mounted in suitable bearings transversely of the frame 2 as clearly shown. (See Figs. 6 and 7.) Shafts 42 and 43 are provided with gears 44 and 45 respectively, adapted to be engaged by the shifting gear 46. Gear 46 drives gear 44 to rotate the standard, for spreading; or it drives gear 45 for taking up or lowering chain 29 for collapsing or extending the elements of the standard. Driving pinion 46 is slidingly mounted in spline engagement upon shaft 47 driven through a train of gears as indicated, from a motor 48 mounted on frame 2.

49 is an operating lever pivoted at 50 in a suitable bracket and provided with a terminal clevis or fork 51 engaging flanged collars connected to or integral with driving gear 46, whereby said gear may be shifted into engagement with gear 44 or gear 45 or to an intervening inoperative position, and there held by suitable mechanism.

It will be understood that during the rotation of the spreader bar by the gears 12 and 41 the raising and lowering mechanism will remain inoperative, and that when the raising or lowering operation is being performed, the rotative mechanism will likewise remain inoperative. For such purpose, I have provided the interlocking mechanism indicated in Figs. 6 and 7, in which shaft 43 is provided with a ratchet wheel 52 adapted to be engaged by pawl 53 pivoted at 54, shaft 42 being also provided with a ratchet wheel 55 adapted to be engaged by a pawl 56 pivoted at 57 on the main frame 2. The pawls 53 and 56 are connected by a link 58, the lower end of which engages end of pawl 56 with clearance for preliminary lost motion, and for the purpose of operating both pawls together, I have provided a sliding cam bar 59 extending through frame 2, provided with a beveled shoulder 60 for lifting the inner end of pawl 53 to release its terminal from wheel 52, when bar 59 is drawn outwardly by pinion 46, with which it engages by means of a fork 59' embracing behind a collar 61 on pinion 46 by the hub thereof. By this means, as pinion 46 is thrust into engagement with rotating gear 44, the pawls 53 and 56 will be dis-engaged from their ratchet wheels, and on the other hand, when pinion 46 is thrust into engagement with gear 45, both ratchets will become reëngaged by their pawls, but pawl 53 will slip past the teeth of ratchet 52 during its operation.

Figure 13:
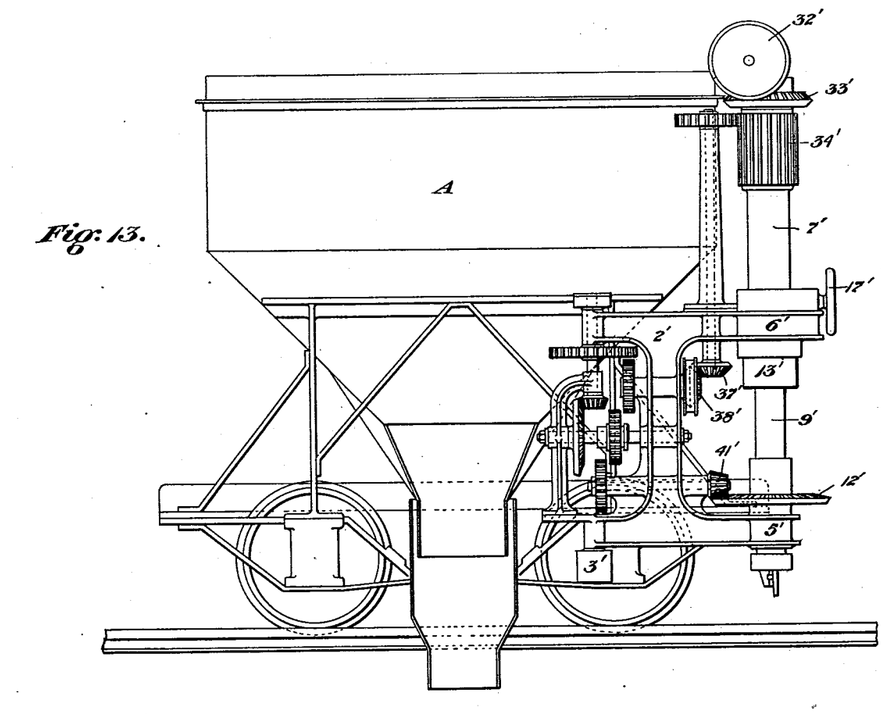
Fig. 13 is a side view of a larry provided with the leveling machine.

For the purpose of fixedly locating the swinging frame 2 at the desired position over the trunnel opening of each particular oven, the frame 2 is provided with a locking handle 62 pivoted at 63 on frame 2 and engaging by its inner terminal a segmental locking form 64 of well known construction. By this means the frame 2 may be swung to the desired position, as indicated in Fig. 11 and there locked, the entire working mechanism and all of its parts swinging around with the frame, while by the same means the frame 2 may be thrown backwardly alongside of the larry track, as indicated in dotted lines in said figure and in Fig. 13, for clearance of any obstruction and for fixing it in inoperative position.

For the purpose of providing means for insuring the centralization of the mechanism over or through the center of the trunnel hole of the oven, I have provided a vertical adjustable center guide or ring 65, embracing plunger 9 as shown, in either raised or lowered position, which ring is vertically adjustable within the frame 2 by means of a square or splined guide rod 66 extending upwardly through the frame member carrying bearing 5, and provided with a counterbalance weight 67 at the end of a chain 68 passing over a supporting sheave 69. By this means, the lowering of the operative mechanism through the trunnel opening is facilitated, the centering ring 65 being first located above the trunnel opening and also thereinto, after which the plungers 9 and 18 are further lowered, their position being thus fixedly assured. Accidental engagement or failure to centralize with the trunnel opening is thus prevented, avoiding breakage of the mechanism and insuring manipulation of the device in the manner intended.

Figures 1, 1A:
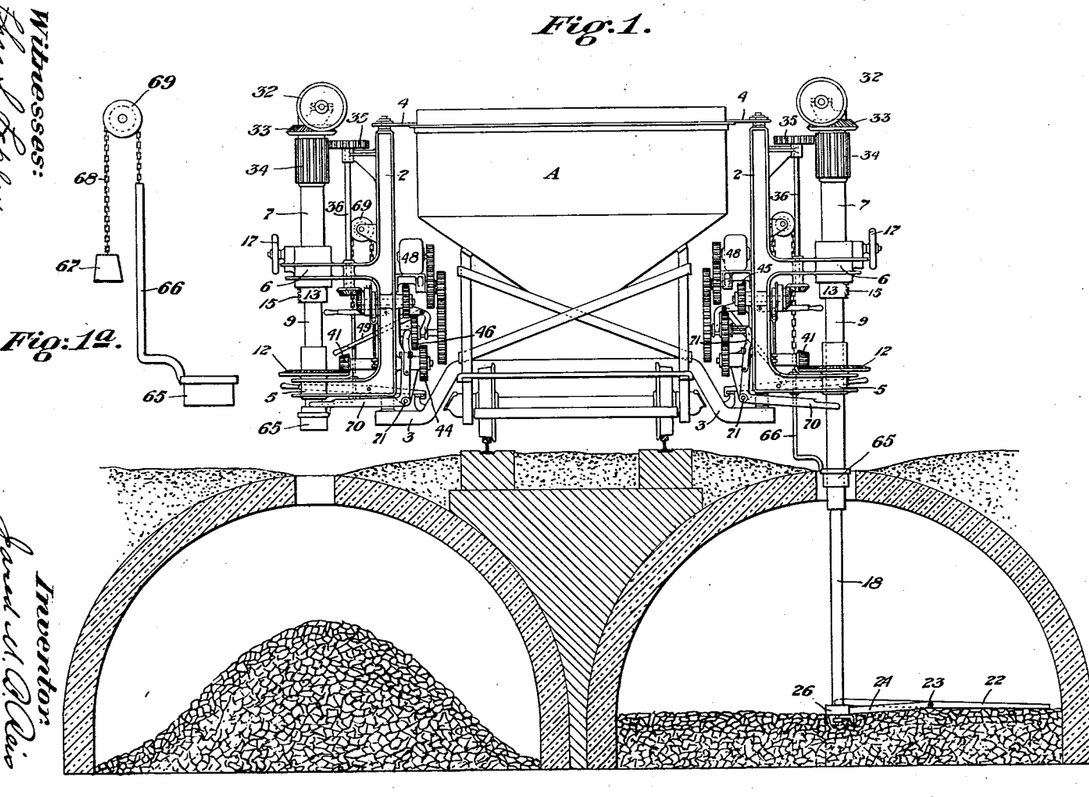
Figures 19, 20:
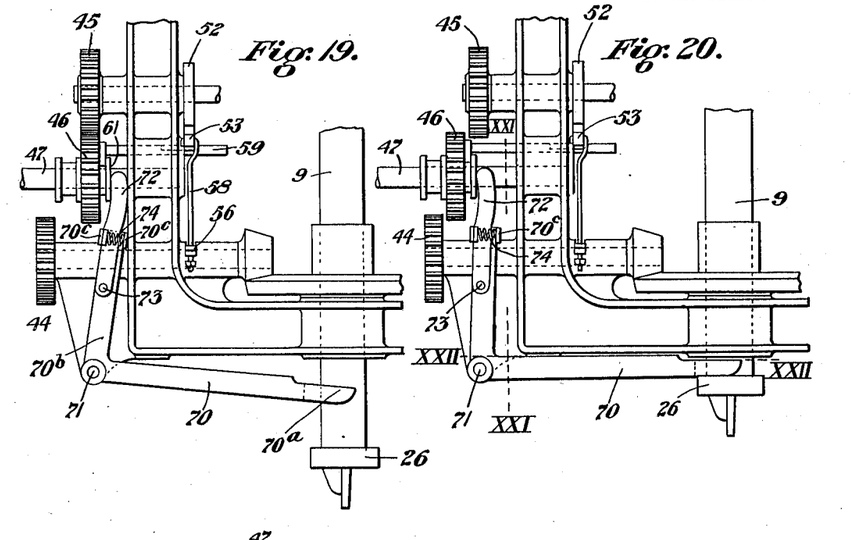
Figs. 19 and 20 are detail views in elevation of the automatic gear shifting device.

The operation of the invention will be readily understood from the foregoing description. When the plungers are collapsed as indicated at the left side of Fig. 1 and in Fig. 3, they may be lowered by gravity in the manner described and upon being rotated will effect their desired function. Thereupon, upon raising the chain 29, the inner end of the spreader bar will be first raised as indicated in Fig. 12 and the bar will be drawn into vertical alinement and seated within the cavity of the lower plunger 18, as indicated in Fig. 3. Thereupon, further upward lifting will exert lifting action of plunger 18, due to connections 23 and 25 until the lower plunger 18 has been raised within plunger 9, whereupon head 26 engaging the lower end of plunger 9 will lift said plunger, both plungers thus rising within cylinder 7. By such telescoping operation, all of said parts are snugly assembled together, at which position the lower end of plunger 18 and terminal of spreader bar 22 will have been raised entirely above the trunnel opening, as is also guiding ring 64 by its chain, whereupon the machine may be shifted to the next oven. I have also provided automatic means for disengaging pinion 46 from lifting pinion 45 at the end of the upward travel of plunger 18. This consists of a bell crank lever 70 having a forked terminal 70$^a$ embracing the plunger 9 and in range for engagement by the head 26 as it rises. Lever 70 is pivoted at 71 to the main frame and has an upwardly extending arm 70$^b$ provided with laterally extending lugs 70$^c$. 72 is a flexible lever extension pivoted to arm 70$^b$ at 73, extending beyond the lugs 70$^c$ and having a forked terminal 72$^a$. Said terminal embraces shaft 47 and engages collar 61 of gear 46 and is cushioned by a spring 74 bearing against inner lug 70$^c$ and a similar lug 70$^c$ on arm 72. Normally, when the plunger is lowered, arm 70 falls by gravity and retracts the upper end of the lever, as in Fig. 19. When the plunger rises head 26 comes into contact with forked terminal 70$^a$ thrusting gear 46 outwardly from mesh with gear 45 effecting automatic disengagement, as in Fig. 20. The cushion spring 72$^b$ prevents too sudden impact of the lever terminal and eases its action. The advantage of the spring-pressed terminal 72 is that it will normally hold sliding pinion 46 away from contact with pinion 45, preventing interference of the teeth when not in mesh.

The machine as a whole is well adapted to successfully perform its operations, and it will be observed that the folding of the spreader bar in the manner provided, avoids the throwing of its outer terminal upwardly and the resulting liability to engage the roof of the oven by its point, the collapsing operation avoiding any such possibility and resulting in the positive folding inwardly of the spreading mechanism.

It will be understood that the working mechanism may, with equal facility, be located at the front or rear end of the larry or truck, for operation on a single row of ovens having their trunnel openings located between the tracks, and that the effectiveness of the invention is in no way dependent on the particular manner of mounting the device upon its carriage.

Figure 14:
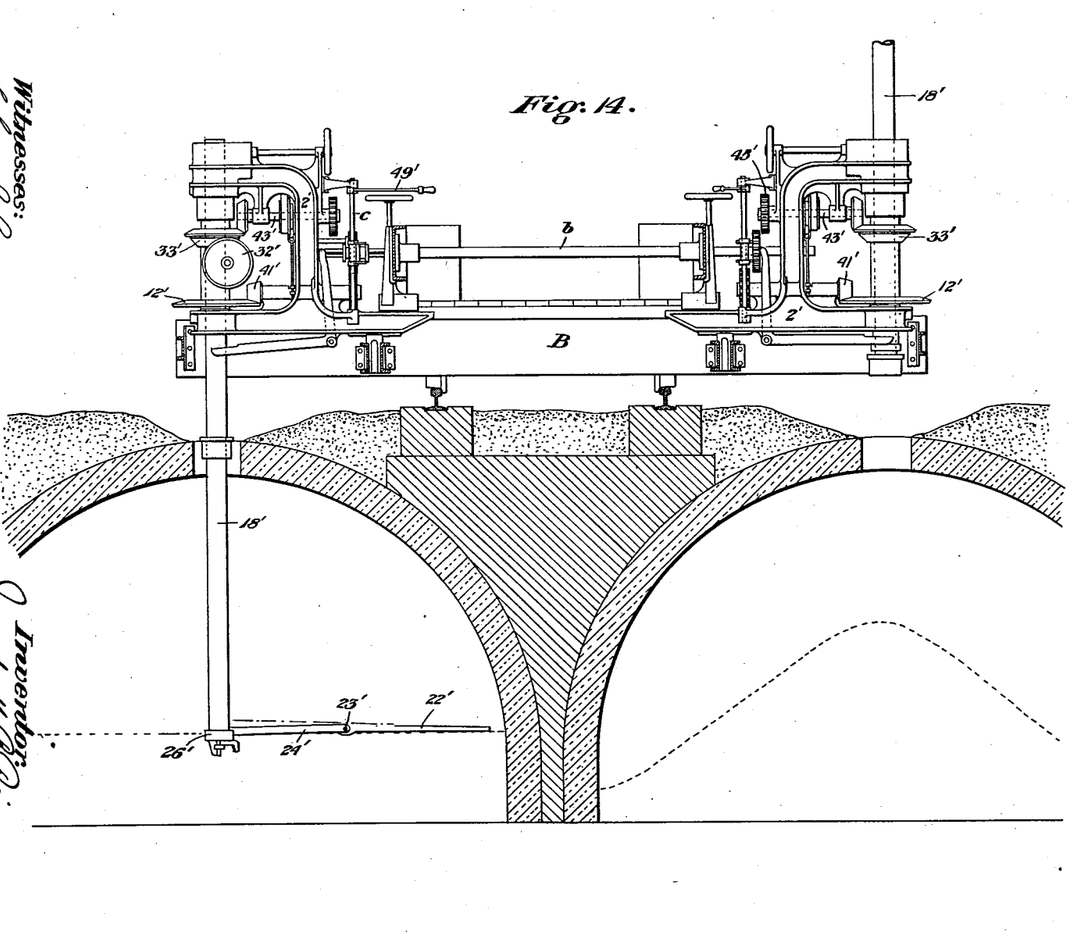
Fig. 14 is a view similar to Fig. 1 showing a supporting truck and a somewhat modified construction of leveling machine at each side thereof.
Figure 15:
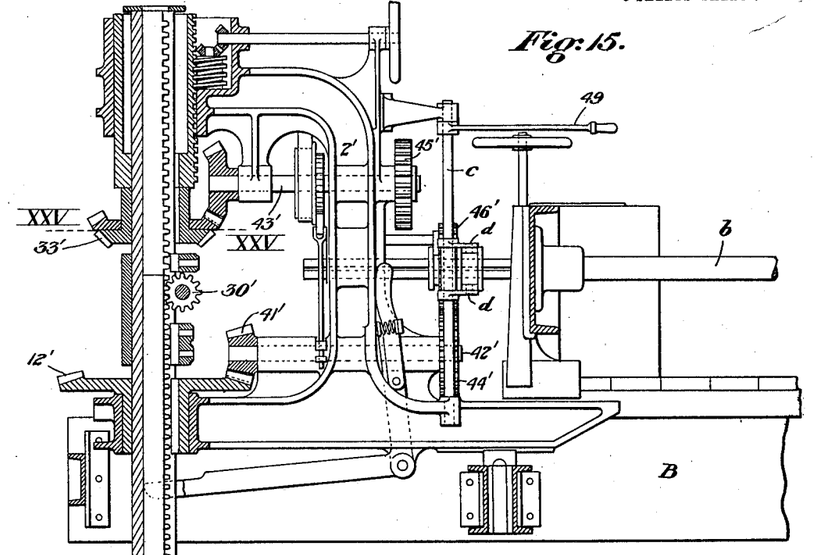
Fig. 15 is a sectional view, partly broken away, illustrating the working mechanism of said machine, similar to Fig. 2.
Figure 16:
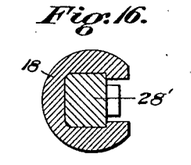
Figs. 16, 17, and 18 are cross sections on the lines XVI. XVI; XVII. XVII; and XVIII. XVIII, respectively of Fig. 15.
Figure 17:
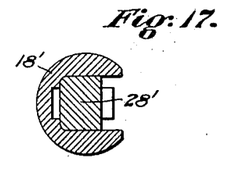
Figure 18:
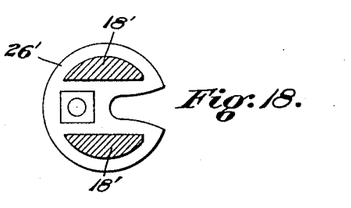

In Figs. 14 and 18 inclusive, I have illustrated a modified construction of the apparatus differing from that above described principally in the construction of the vertically adjustable operating mechanism and its terminal spreader bar. In said construction, which I shall not describe in detail as to such parts which correspond or form the equivalent of the main operating parts of the machine, it is shown as mounted upon a truck or carriage B mounted, like the machine described, by wheels upon tracks located mid-way between two rows of adjacent ovens. In this construction, the frame 2' may be readily adjustable as described, or fixedly mounted upon the carriage so as to drive the mechanism at each side through a common shaft $b$ driven by any suitable motor, from which at each end power may be taken for each leveler. In this construction I employ but a single vertical plunger 18' within which is mounted a rack bar 28' having teeth on its face as indicated, engaged by a pinion 30' actuated through bevel gears 32', 33', from shaft 43', actuated through pinion 45' and operating mechanism, similar to that described.

22' is the spreader bar, pivoted at 23' to the link 24' which in turn is pivoted at its inner end to the lower head 26' at the end of the plunger 18'. The inner end of the spreader bar is pivoted at 27' to the lower end of bar 28', and its face, like said bar, is toothed. In operation, bar 28' is lowered by its pinion 30' to erect the spreader to the position shown at the left of Fig. 14 and in Fig. 15, and is raised by reversing the pinion which will lift bar 28' until the spreader bar is folded into alinement with the plunger. Thereafter the plunger itself with its parts will be further raised by rotation of the pinion, until the mechanism is elevated, as at the right of Fig. 14. The upper end of bar 28' extends above the pinion a sufficient distance as shown, to provide for further independent lowering or adjustment to the desired level, and it will thus be seen that by this mechanism the device may be raised or lowered with equal facility as by the means already described. For rotation of the plunger and spreader bar 22', I employ bevel gearing 41' and 12' whereby through shaft 42' power is transmitted through gears 44' and sliding gear 46' from shaft $b$, the sliding gear being in such case adjusted by a lever 49' on a vertical shaft $c$ carrying shifting levers $d$, $d$.

What I claim is:—

1. A coal leveler provided with a telescoping plunger having an inner vertically movable bar and an adjustable spreader bar pivoted at its inner end thereto, and a bracing strut below the spreader bar pivoted to the lower end of the plunger and to the spreader bar, substantially as set forth.

2. A coal leveler provided with a telescoping plunger having an inner vertically movable bar and an adjustable spreader bar pivoted at its inner end thereto, a bracing strut below the spreader bar pivoted to the lower end of the plunger and to the spreader bar, and means for raising and lowering the inner end of the spreader bar, substantially as set forth.

3. A coal leveling apparatus provided with a vertically adjustable working tool and a vertically adjustable ring therefor arranged for location with relation to the trunnel opening of an oven, and having a counterweighted traveling adjustable supporting arm, substantially as set forth.

4. A coal leveling apparatus provided with a laterally adjustable carrying frame and a vertically adjustable plunger provided with a terminal adjustable spreader bar, a vertically adjustable guiding ring for the plunger arranged for location within the trunnel opening of an oven, and a counterweighted vertically adjustable arm for said ring slidingly mounted in said carrying frame, substantially as set forth.

5. The combination of a traveling carriage, of a laterally adjustable frame thereon, vertically adjustable plunger mechanism mounted in the frame provided with an inner vertically movable bar, an adjustable spreader bar pivoted at its inner end thereto, a bracing strut below the spreader bar pivoted to the lower end of the plunger and to the spreader bar, a vertically adjustable ring for centering and guiding the plunger, and a vertically movable guide rod therefor, substantially as set forth.

6. In a coal leveling apparatus, the combination with a supporting frame, of a cylinder mounted therein, vertically adjustable plunger mechanism in telescoping engagement with the cylinder, a terminal spreader bar, means extending through the plunger mechanism for adjusting the spreader bar connected to the inner end thereof, and means for rotating the plunger mechanism.

7. In a coal leveling apparatus, the combination with a supporting frame, of a cylinder mounted therein, vertically adjustable plunger mechanism in telescoping engagement with the cylinder, a terminal spreader bar, means extending through the plunger mechanism for adjusting the spreader bar connected to the inner end thereof, means for rotating the plunger mechanism, and means for vertically adjusting the cylinder.

8. In a coal leveling apparatus of the class described, a vertically adjustable plunger provided with a terminal pivoted latch adapted to engage the spreader bar to distend it, a spreader bar, raising means connected with the inner end of the spreader bar, and a link pivoted to the middle portion of the bar and to the terminal of the plunger.

9. In a coal leveling apparatus of the class described, the combination with a vertically adjustable plunger provided with a spreader bar and means for raising it, a connecting link pivoted to the spreader bar and to the end of the plunger, and a pivotally mounted latch adapted to engage the coal and to thrust the terminal end of the spreader bar outwardly from the end of the plunger when rotated, for the purpose described.

10. In a coal leveling apparatus, the combination of a pivotally mounted carrying frame provided with an upper cylinder, a vertically adjustable plunger in spline engagement therewith and provided with a similarly mounted terminal plunger having an adjustable spreader bar, flexible means for adjusting said spreader bar extending through the plungers and cylinder, a sheave for said means and actuating mechanism therefor, means for rotating the plungers, and means for independently adjusting the cylinder, substantially as set forth.

In testimony whereof I affix my signature in presence of two witnesses.

JARED M. B. REIS.

Witnesses:
 O. M. CLARKE,
 CHAS. S. LEPLEY.